54-19.R 31

BEST AVAILABLE COPY

M. TURLEY.

HORSE COLLAR.

No. 10,431. Reissued Dec. 25, 1883.

WITNESSES

C. T. Belt

Wm J. Tanner

INVENTOR

Marshall Turley

By Paine & Ladd

Attorneys

N. PETERS, Photo-Lithographer, Washington, D. C.

UNITED STATES PATENT OFFICE.

SPECIFICATION forming part of Reissued Letters Patent No. 10,431, dated December 25, 1883.

Original No. 213,474, dated March 18, 1879. Application for reissue filed October 20, 1883.

*To all whom it may concern:*

Be it known that I, MARSHALL TURLEY, a citizen of the United States, residing at Council Bluffs, in the county of Pottawattamie and State of Iowa, have invented certain new and useful Improvements in Horse-Collars; and I do hereby declare the following is a full, clear, and exact description of the invention, that will enable others skilled in the art to which it appertains to make and use the same, reference being had to the accompanying drawings, and to the letters of reference marked thereon, which form a part of this specification.

The present invention relates to that class of horse-collars which are provided with a stuffed pad, swell, or belly extending from a rigid rim; and the object of the invention is to provide a collar which will have a firm and easy bearing on the shoulders of the horse, increase his power of draft, and conform to the movement of the horse without causing friction or the rolling movement common to ordinary collars, which is liable to injure the horse, the durability, fitting, and appearance of the collar being also improved.

To these ends the invention consists in the construction and combination of parts, which will be hereinafter more fully described, and then set forth in the claims.

Figure 1:
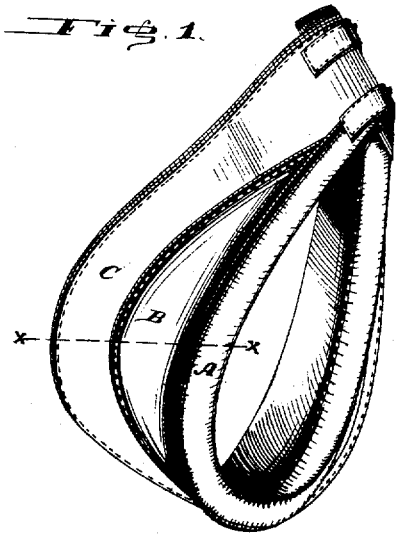
Figure 2:
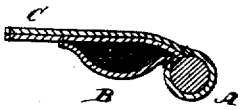
Figure 3:
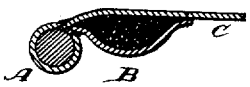

In the drawings, Figure 1 is a perspective view of a horse-collar constructed according to my invention. Fig. 2 is a cross-section taken through the line *x x*, Fig. 1, showing a flexible flange formed of two plies of leather extending from a stuffed body or pad. Fig. 3 is a cross-section showing a flexible flange formed of a single ply of leather.

The letter A represents the rim of the collar, and B B the pads or body portion thereof, which are made of any suitable size. The rim and pads are stuffed with any suitable material, so that they will be sufficiently stiff or rigid to afford a firm bearing for the hames. In the present instance the collar is shown as being open at the top only, where it is held by suitable buckles and straps; but it is obvious that it may be open both at the bottom and top.

The letter C designates a flexible flange, which forms part of the collar and extends outwardly or beyond the stuffed pads B or body portion of the collar, and a suitable distance around the same. This flexible flange forms a pliable or elastic extension or margin of said collar-body that will yield to the motion of the horse and bear upon the shoulders of the latter without causing friction, which obviously renders a collar made in this manner more comfortable and easier to the horse than others having only the stiff body or pads. It is well known that the ordinary collar, being stiff on its outer edge, will not yield, and for this reason friction is produced and the collar otherwise rendered uncomfortable to the horse. The flexible flange devised by me effectually obviates such objections, and also adds to the strength and finish of the collar.

The collar is stuffed in such a manner that the inner faces of the pads or bellies B are preserved in a flat condition, as is shown in Fig. 2, thereby giving considerable more bearing upon the shoulders of the horse than with a round-faced pad, and preventing the rolling of the collar and avoiding friction. It will be understood that ordinary collars are provided with a rounded belly or rounded faces bearing upon the horse, which gives a rolling motion of the collar that wrinkles the skin and hurts the horse.

In a collar made according to my invention, the pad or stuffing is located on the front of the collar, so as not to swell the face of the belly of the latter, the faces in contact with the horse being flat, as heretofore stated.

Referring to Figs. 1 and 2, it will be seen that the flange is made double—that is, it is formed of two layers or thicknesses of leather, which are stitched together at their outer edges and secured to the rim and to the pad or stuffed body by stitching or other suitable means. It will be obvious that these two layers of leather not only comprise the flexible flange, but also the flat belly portion or flat faces that come in contact with the horse. In Fig. 3, however, the "double flange" is replaced by a flange formed of a single thickness or ply of leather, which is stitched to the rim and to the back leather at the outer edge of the body or pad of the collar.

I am aware that it is not new to construct a horse-collar of a stuffed rim and an elastic pad formed of two thicknesses of sole-leather, this elastic pad having stuffed ribs secured thereto for holding the hames between the same and the stuffed rim.

Having thus described my invention, what I claim as new, and desire to secure by Letters Patent, is—

1. A horse-collar having a flexible or pliable flange extending around the edge thereof and beyond the stuffed pads or bellies, being an unbroken continuation of the inner or bearing surfaces of said pads or bellies, substantially as and for the purpose set forth.

2. A horse-collar constructed with a flat belly and the pad or stuffing on the front of the collar, as and for the purposes herein set forth.

In testimony whereof I affix my signature in presence of two witnesses.

MARSHALL TURLEY.

Witnesses:
W. S. MAYNE,
F. M. HUNTER.